United States Patent [19]
Tsuruta et al.

[11] Patent Number: 5,381,875
[45] Date of Patent: Jan. 17, 1995

[54] DISC BRAKE ASSEMBLY

[75] Inventors: Matsuhisa Tsuruta; Ryuichi Sakakibara; Masayoshi Katagiri, all of Toyota, Japan

[73] Assignee: Aisin Seiki Kabushiki Kaisha, Kariya, Japan

[21] Appl. No.: 41,442

[22] Filed: Mar. 31, 1993

[30] Foreign Application Priority Data

Mar. 31, 1992 [JP] Japan ................... 4-077774

[51] Int. Cl.$^6$ .............................................. F16D 55/04
[52] U.S. Cl. ..................... 188/73.38; 188/73.37
[58] Field of Search ............. 188/73.31, 73.37, 73.38, 188/73.39, 370, 250 E

[56] References Cited

U.S. PATENT DOCUMENTS 4,467,897  8/1984  Kubo ...................... 188/73.38
4,699,254 10/1987  Mery ...................... 188/73.38

FOREIGN PATENT DOCUMENTS 58-146732  1/1983  Japan .................... 188/73.38
60-21559   6/1985  Japan .

Primary Examiner—Robert J. Oberleitner
Assistant Examiner—Clifford T. Bartz
Attorney, Agent, or Firm—Oblon, Spivak, McClelland, Maier & Neustadt

[57] ABSTRACT

A disc brake assembly which includes a disc rotor, a mounting member having arm portions in which a pair of grooves extending toward the axial direction of the disc rotor are provided therein, a pair of brake pads disposed to both sides of the disc rotor, at least one of the brake pads having a pair of ear portions which are outwardly projected in the rotational direction of the disc rotor and which are fitted into the grooves of the mounting member so as to be slidably supported on the mounting member, a caliper member slidably supported on the mounting member so as to be movable in an axial direction of the disc rotor and pressing each of the brake pads against faces of the disc rotor, respectively and pad clips engaged with the arm portions of the mounting member so as to cover faces of the grooves and being provided with a first elastic member which is formed on the pad clip in a body and which always outwardly urges the brake pad with a low load in the diametrical direction of the disc rotor through the ear portion and a second elastic member which is formed on the pad clip in a body and which is adjacent to the first elastic member so as to be able to receive the ear portion of the brake pad with high load, respectively. According to this improved disc brake assembly, it is able to slidably support the brake pad on the mounting member without a play in the diametrical direction of the disc rotor while preventing the generation of the dragging phenomenon.

5 Claims, 3 Drawing Sheets

DISC BRAKE ASSEMBLY

BACKGROUND OF THE INVENTION

1. Field of the Invention

The present invention relates to a disc brake assembly for wheeled vehicles, and more particularly to a disc brake assembly including an elastic member which is integrally formed on a pad clip engaged with a mounting member in order to slidably support the brake pad on the mounting member and which urges a brake pad outwardly in the diametrical direction of a disc rotor.

2. Description of the Prior Art

A conventional disc brake assembly of this kind is disclosed, for example, in Japanese utility-model publication No. 60 (1985)-21559. This conventional disc brake assembly includes a disc rotor (not shown) rotated together with a wheel in a body, a pair of brake pads disposed to both sides of the disc rotor, a mounting member fixed to a stationary member of a vehicle and supporting each of the brake pads so as to be able to slide in the parallel direction with respect to a rotational shaft of the disc rotor, a calipher member slidably supported on the mounting member so as to be movable in an axial direction of the disc rotor and pressing each of the brake pads against faces of the disc rotor, respectively and pad clips engaged with the mounting member so as to be interposed between the mounting member and each of both circumferential ends of the brake pads, respectively.

The mounting member is provided with a pair of arm portions which are disposed to both sides of the disc rotor and in which a pair of grooves extend toward the axial direction of the disc rotor. The brake pads are provided with a pair of ear portions which are outwardly projected at the outer side of both ends in the rotational direction of the disc rotor, respectively and which are fitted into the pair of grooves of the arm portions of the mounting member so as to be slidably supported on the arm portions of the mounting member.

Each of the pad clips is engaged with the mounting member so as to cover each of grooves of the mounting member and is provided with an elastic member which urges the ear portion of the brake pad outwardly in the diametrical direction of the disc rotor and which is formed on the pad clip in a body. Thereby, each of the brake pads is always urged by the elastic member of the pad clip so as to contact an upper surface of each of the ear portions with an upper inner surface of each of the grooves and therefore each of the brake pads is slidably supported on the mounting member through the ear portions and the grooves without a play in the diametrical direction of the disc rotor.

In the above conventional disc brake assembly, however, if the urging force of the elastic members is too strong, there is in danger of generation of the dragging phenomenon in which the contact between the brake pads and the disc rotor is maintained after the release of the operation of the disc brake assembly. On the contrary, if the urging force of the elastic members is too weak, play is generated between the ear portions of the brake pads and the grooves of the mounting member and therefore there is danger of generation of an uncomfortable noise by the vibration of the vehicle or the wheels due to driving on a bad road.

SUMMARY OF THE INVENTION

It is, therefore, an object of the present invention to provide an improved disc brake assembly which overcomes the above drawbacks.

It is another object of the present invention to provide an improved disc brake assembly which can slidably support the brake pad on the mounting member without play in the diametrical direction of the disc rotor while preventing generation of the dragging phenomenon.

In order to achieve these objects, there is provided a disc brake assembly which includes a disc rotor rotated together with wheel in a body, a mounting member fixed to a stationary member of a vehicle and having arm portions in which a pair of grooves extending toward the axial direction of the disc rotor are provided therein, a pair of brake pads disposed to both sides of the disc rotor, at least one of the brake pads having a pair of ear portions which are outwardly projected at the outer side of both ends thereof in the rotational direction of the disc rotor and which are fitted into the grooves of the arm portion of the mounting member so as to be able to slide in the parallel direction with respect to a rotational shaft of the disc rotor, a caliper member slidably supported on the mounting member so as to be movable in an axial direction of the disc rotor and pressing each of the brake pads against faces of the disc rotor, respectively and pad clips engaged with the arm portions of the mounting member so as to cover faces of the grooves and being provided with a first elastic member which is formed on the pad clip in a body and which always outwardly urges the brake pad with a low load in the diametrical direction of the disc rotor through the ear portion and a second elastic member which is formed on the pad clip in a body and which is adjacent to the first elastic member so as to be able to receive the ear portion of the brake pad with high load, respectively.

BRIEF DESCRIPTION OF THE DRAWINGS

Additional objects and advantages of the present invention will become more apparent from the following detailed description of a preferred embodiment thereof when considered with reference to the attached drawings, in which.

DESCRIPTION OF THE PREFERRED EMBODIMENTS

A disc brake assembly constituted in accordance with a preferred embodiment of the present invention will be described with reference to the attached drawings.

Figure 1:
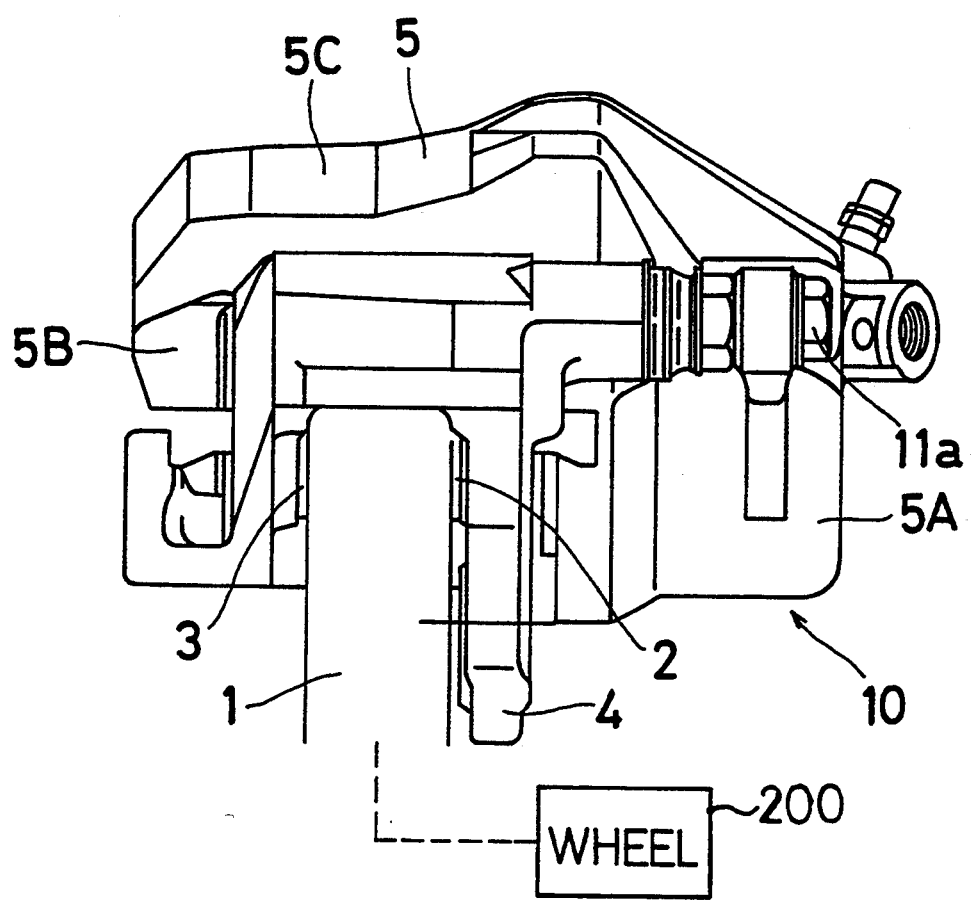
FIG. 1 is a side view of an embodiment of a disc brake assembly in accordance with the present invention.
Figure 2:
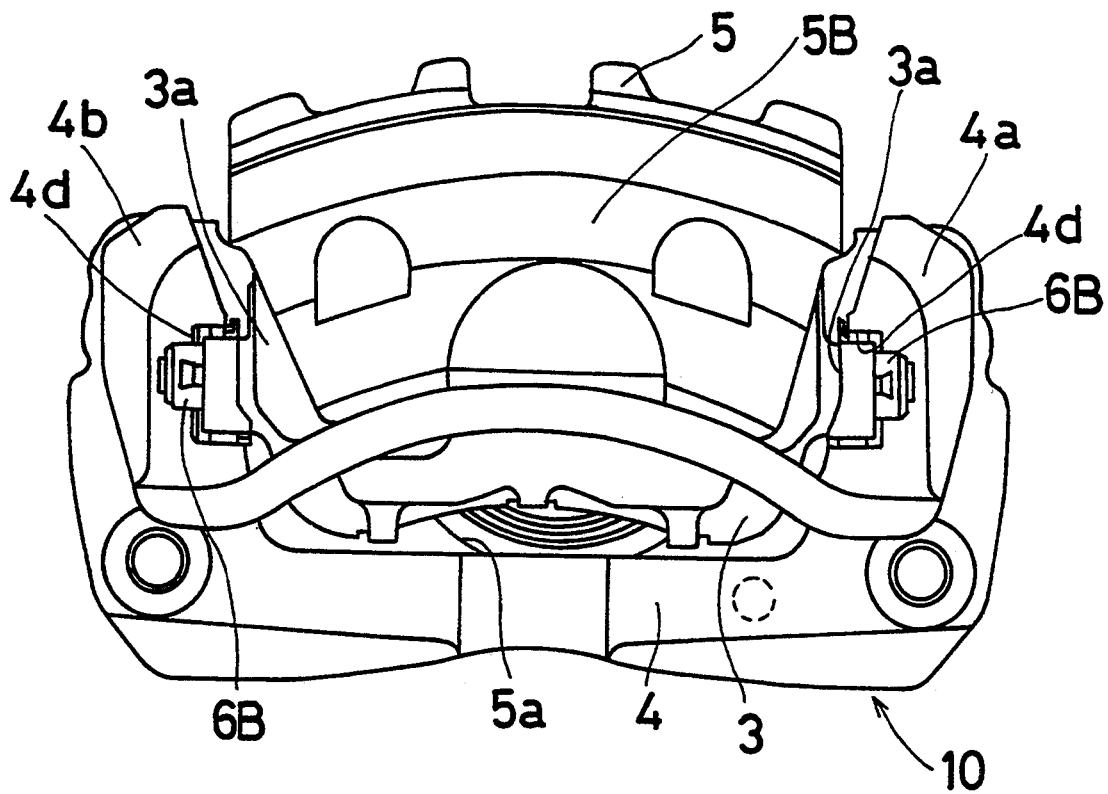
FIG. 2 is a front elevational view of an embodiment of a disc brake assembly in accordance with the present invention.
Figure 3:
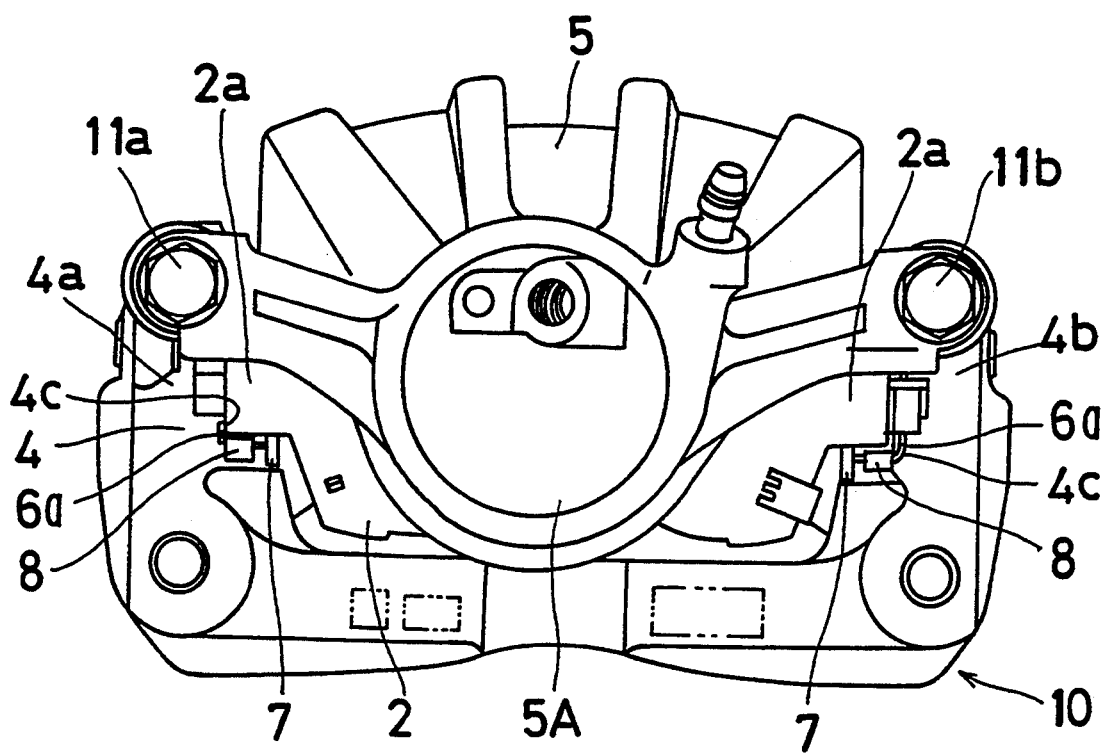
FIG. 3 is a rear elevational view of an embodiment of a disc brake assembly in accordance with the present invention.
Figure 4:
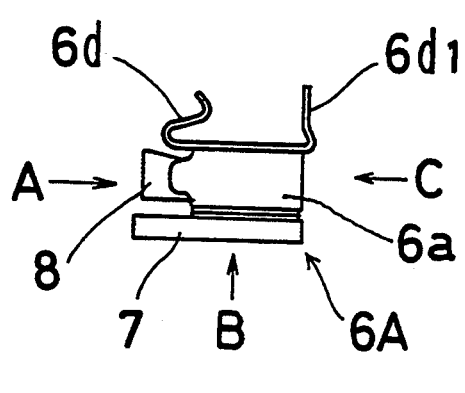
FIG. 4 is a top view of a pad clip of an embodiment of a disc brake assembly in accordance with the present invention.
Figure 5:
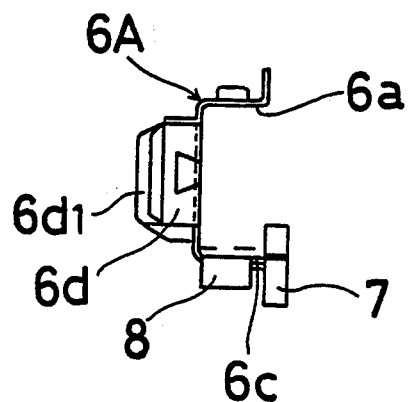
FIG. 5 is a side view which sees from an arrow A in FIG. 4.

Referring to FIGS. 1 to 3, there is schematically illustrated a disc brake assembly 10 which includes a disc rotor 1, a pair of brake pads (an inner brake pad 2, an outer brake pad 3), a mounting member 4, a caliper member 5 and pad clips 6. The inner brake pad 2 and the outer brake pad 3 are disposed to both side of the disc rotor 1 which is rotated with wheel 200 in a body, respectively.

The inner brake pad 2 is provided with a pair of ear portions 2a which are outwardly projected at center portions of both ends in the rotational direction of the disc rotor 1 of its backing plate, respectively. The respective ear portions 2a are fitted into a pair of groove portions 4c which are formed on a pair of arm portions 4a, 4b of the mounting member 4, respectively, whereby the inner brake pad 2 is slidably supported on the arm portions 4a, 4b of the mounting member 4 in the axial direction of the disc rotor 1. The mounting member 4 is provided with a pair of arm portions 4a, 4b which are straddling a portion of the disc rotor 1, respectively and is fixed to a part of a vehicle body at inner side of the disc rotor 1.

On the other hand, the outer brake pad 3 is provided with a pair of ear portions 3a which are outwardly projected at center portions of both ends in the rotational direction of the disc rotor 1 of its backing plate, respectively. The respective ear portions 3a are fitted into a pair of groove portions 4d which are formed on the arm portions 4a, 4b of the mounting member 4, respectively, whereby the outer brake pad 3 is slidably supported on the arm portions 4a, 4b of the mounting member 4 in to the axial direction of the disc rotor 1.

The caliper member 5 is straddling a portion of the disc rotor 1 and is provided with a reaction portion 5B pressing the outer brake pad 3 toward to an outer side surface of the disc rotor 1, a cylinder portion 5A receiving a piston (not shown) which presses the inner brake pad 2 toward to an inner side surface of the disc rotor 1 and a bridge portion 5C connecting the reaction portion 5B and the cylinder portion 5A. Further, the caliper member 5 is provided with a pair of pin bolts 11a, 11b. Each of the pin bolts 11a, 11b is slidably supported on a pair of guiding holes (not shown) which are formed in the arm portions 4a, 4b of the mounting member 4 in an axial direction, respectively. Now, the sliding portions between the each of the pin bolt 11a, 11b and the each of the guiding hole is liquid-tightly sealed and is protected from the muddy water and so on, respectively, and the sliding portion between a cylinder hole 5a of the cylinder portion 5A and the piston is liquid-tightly sealed by a seal ring (not shown) and is protected from the muddy water and so on by a boot.

The pad clips 6A, 6B are engaged with the arm portions 4a, 4b of the mounting member 4 so as to cover inner faces of the groove portions 4c, 4d along the inner faces of the groove portions 4c, 4d and so as to be positioned between the ear portions 2a, 3a of the brake pads 2, 3 and the groove portions 4c, 4d, respectively. Each of the pad clips 6A, 6B is made of a metallic plate having corrosion resistance and elasticity and is provided with a first guide portion 6a covering an upper inner face of the groove portion 4c(4d), a second guide portion 6b covering a vertical inner face of the groove portion 4c(4d), a third guide portion 6c covering a lower inner face of the groove portion 4c(4d) and nail portions 6d, 6d1 as shown in FIG. 4 to FIG. 7. The nail portions 6d, 6d1 nip elastically the arm portions 4a, 4b in the axial direction of the disc rotor 1 and thereby the pad clips 6A, 6B are elastically engaged with the arm portions 4a, 4b of the mounting member 4, respectively.

Figure 6:
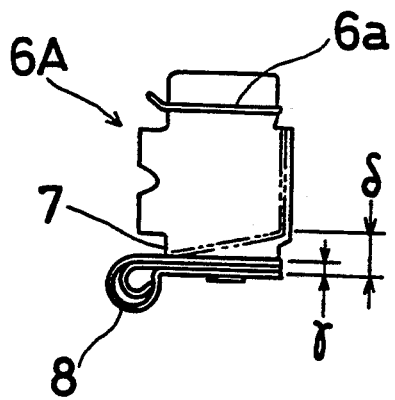
FIG. 6 is a side view which sees from an arrow B in FIG. 4.
Figure 7:
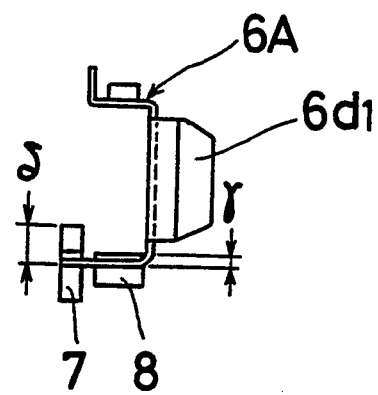
FIG. 7 is a side view which sees from an arrow C in FIG. 4.

In this embodiment, a first elastic member 7 and a second elastic member 8 are formed on each of the pad clips 6A in a body, respectively. Namely, the first and second elastic member 7, 8 is made of a metallic plate having corrosion resistance and elasticity. The first elastic member 7 is continuously formed on the third guide portion 6c and extends toward the disc rotor 1 in the axial direction of the disc rotor 1 between the ear portion 2a of the inner brake pad 2 and the third guide portion 6c in the groove 4c. The initial condition of the first elastic member 7 in which there is a clearance δ between the top end of the first elastic member 7 and the third guide portion 6c is shown in FIG. 6 and FIG. 7 by two dotted chain line and thereby the first elastic member 7 is elastically deformed by the ear portion 2a during assembly so as to normally urge the inner brake pad 2 generally outwardly in the diametrical direction of the disc rotor 1. Thereby, the inner brake pad 2 is slidably supported on the mounting member 4 without play in the diametrical direction of the disc rotor 1. The first elastic member 7 has a low spring characteristic for urging the inner brake pad 2 outwardly urged in the diametrical direction of the disc rotor 1. Thereby, the friction force between the ear portions 2a of the inner brake pad 2 and the first elastic members 7 is reduced.

The second elastic member 8 is continuously formed on the third guide portion 6c and is adjoined to the first elastic member 7. The second elastic member 8 extends toward the disc rotor 1 in the axial direction of the disc rotor 1 between the ear portion 2a of the inner brake pad 2 and the third guide portion 6c in the groove 4c. In the initial condition of the first elastic member 8 there is a clearance γ between the top end of the second elastic member 8 and the third guide portion 6c, which is shown in FIGS. 6 and 7 by two dotted chain line, and the second elastic member 8 does not contact with the car portion 2a of the inner brake pad 2 under the assembly condition. When the vehicle or the wheel vibrates the inner brake pad 2 vibrates while elastically deforming the first elastic member 7 in the diametrical direction of the disc rotor 1. However, if the second elastic member 8 is contacted with the ear portion 2a of the inner brake pad 2, the second elastic member 8 has a spring characteristic which is so high that the vibration of the inner brake pad 2 is absorbed.

As mentioned above, in this embodiment, the pad clips 6B which are interposed between the ear portions 3a of the outer brake pad 3 and the arm portions 4a, 4b of the mounting member 4 are not provided with the first and second elastic member 7, 8. However, it is advisable to use the pad clips 6B which are provided with the first and second elastic member 7, 8.

The above-described embodiment of the disc brake assembly operates as follows. Referring to FIGS. 1 to 3, when the hydraulic pressure is applied to the cylinder hole 5a of the cylinder portion 5A of the caliper member 5, the piston (not shown) presses the inner brake pad 2 toward the inner side surface of the disc rotor 1 and the reaction portion 5B presses the outer brake pad 3 toward the outer side surface of the disc rotor 1 by a reaction force of the hydraulic pressure pressing the inner brake pad 2 through the piston (not shown). Thereby, both brake pads 2, 3 are frictional engaged with the disc rotor 1 and the wheel which is rotated with the disc rotor 1 in a body are braked.

In this condition, since the inner brake pad 2 is slidably supported on the mounting member 4 without play in the diametrical direction of the disc rotor 1, the inner brake pad 2 is smoothly slided in the grooves 4c of the mounting 4 through the pad clips 6A.

When the operation of the disc brake assembly is released, the brake pads 2, 3 move by reaction so as to be separated from the disc rotor 1. In this time, since the first elastic member 7 has a spring characteristic which is so low load that the inner brake pad 2 is outwardly urged in the diametrical direction of the disc rotor 1 and thereby the friction force between the ear portions 2a of the inner brake pad 2 and the first elastic members 7 is reduced, the movement of the inner brake pad 2 is not prevented by the friction force. Therefore, it is able to prevent the generation of the dragging phenomenon in which the contact between the inner brake pad 2 and the disc rotor 1 is maintained after the release of the operation of the disc brake assembly.

In this embodiment, since the first elastic member 7 has a spring characteristic which is low, the inner brake pad 2 is able to be vibrated in the diametrical direction of the disc rotor 1 by the vibration of the vehicle or the wheel due to driving on the bad road. In this case, when the inner brake pad 2 is vibrated and thereby is moved inwardly in the diametical direction of the disc rotor 1, the ear portions 2a of the inner brake pad 2 is contacted with the second elastic member 8. In this time, since the second elastic member 8 has a spring characteristic which is high, the second elastic member 8 functions as a damper and thereby the vibration of the inner brake pad 2 is absorbed and damped. Accordingly, it is prevented that the uncomfortable noise is generated by a collision between the ear portions 2a of the inner brake pad 2 and the grooves 4c (the pad clips 6A). Now, after the vibration of the inner brake pad 2 is absorbed and damped by the second elastic member 8, the inner brake pad 2 is returned to the position which the ear portions 2a are contacted with the first guide portions 6a by the first elastic member 7.

In the above mentioned embodiment, the present invention is realized to the disc brake assembly of a type which a pair of brake pads are provided with a pair of ear portions slidably supported on the grooves of the arm portions of the mounting member, respectively. However, it is able to realize the present invention to the disc brake assembly of the type which the inner brake pad is provided with a pair of ear portions slidably supported on the groove portions and which the outer brake pad is supported on the reaction portion of the caliper member. Furthermore, it is possible to interpose the pad clips having the first and second elastic member between the ear portion of the outer brake pad and the arm portions of the mounting member.

As mentioned above, according to the present invention, it is able to slidably support the brake pads on the mounting member without a play in the diametrical direction of the disc rotor while preventing the generation of the dragging phenomenon in which the contact between the brake pads and the disc rotor is maintained after the release of the operation of the disc brake assembly by the first elastic member.

Furthermore, according to the present invention, when the brake pads vibrate against the urging force of the first elastic members in the diametrical direction of the disc rotor, the vibration of the brake pads is absorbed and damped by the second elastic member. Accordingly, it is able to prevent the generation of the uncomfortable noise due to a collision between the ear portions of the brake pads and the grooves of the mounting member.

The principle, a preferred embodiment and modes of operation of the present invention have been described in the foregoing description. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A disc brake assembly comprising;
    a disc rotor rotated together with a vehicle wheel in a rotational direction,
    a mounting member fixed to a stationary member of a vehicle having the vehicle wheel, the mounting member having arm portions including a pair of grooves, the grooves extending toward the axial direction of the disc rotor,
    a pair of brake pads disposed at both sides of the disc rotor,
    at least one of the brake pads having a pair of ear portions which are outwardly projected at the outer sides of both ends thereof in the rotational direction of the disc rotor and which are fitted into the grooves of the arm portions of the mounting member so as to be able to slide in a parallel direction with respect to a rotational shaft of the disc rotor,
    a caliper member slidably supported on the mounting member so as to be movable in an axial direction of the disc rotor and pressing each of the brake pads against faces of the disc rotor, respectively, and
    pad clips engaged with the arm portions of the mounting member so as to cover faces of the grooves and being provided with a first elastic member which is formed on each said pad clip and which always outwardly urges the brake pad with a first force in a direction generally parallel to a diametrical direction of the disc rotor through the ear portion and a second elastic member which is formed on the pad clip and which is adjacent to the first elastic member so as to be able to engage the ear portion of the brake pad with a second force, respectively, said second force being higher than said first force.

2. A disc brake assembly as recited in claim 1, wherein the pad clips are made of a metallic plate having corrosion resistance and elasticity.

3. A disc brake assembly as recited in claim 2, wherein the first elastic member and the second elastic member are unitarily formed on the pad clips, respectively.

4. A disc brake assembly as recited in claim 3, wherein the second elastic member does not contact the ear portion of the brake pad normally and is contacted with the ear portion of the brake pad in order to absorb the vibration of the brake pad when the brake pad is vibrated in the diametrical direction of the disc rotor.

5. A disc brake assembly as recited in claim 4, wherein the brake pads are provided with a pair of ear portions which are fitted into the grooves of the arm portions of the mounting member so as to be able to slide in the parallel direction with respect to the rotational shaft of the disc rotor, respectively and the pad clips are interposed between the ear portions of the brake pads and the grooves of the arm portions of the mounting member.

* * * * *